(12) United States Patent
Brunse

(10) Patent No.: US 6,192,831 B1
(45) Date of Patent: Feb. 27, 2001

(54) AUTOMATIC FEEDER

(75) Inventor: Lars Brunse, Faaborg (DK)

(73) Assignee: A/S L. Frandsen, Faaborg (DK)

( * ) Notice: Subject to any disclaimer, the term of this patent is extended or adjusted under 35 U.S.C. 154(b) by 0 days.

(21) Appl. No.: 09/353,268

(22) Filed: Jul. 14, 1999

(30) Foreign Application Priority Data

Jul. 17, 1998 (DK) ........................................ PA 1998 00954
Jun. 3, 1999 (DK) ........................................ PA 1998 00783

(51) Int. Cl.⁷ ................................. A01K 5/00; A01K 5/01
(52) U.S. Cl. ............................................. 119/51.5; 119/61
(58) Field of Search .................................. 119/51.5, 52.3, 119/53, 61, 72

(56) References Cited

U.S. PATENT DOCUMENTS

| D. 229,074 | * | 11/1973 | Cuprak | 119/61 |
| D. 326,742 | * | 6/1992 | Tart | 119/681 |
| 4,337,728 | | 7/1982 | Van Gilst et al. | 119/51.5 |
| 4,825,811 | * | 5/1989 | O'Kelley | 119/51.5 |
| 5,447,119 | | 9/1995 | Rasmussen | 119/51.5 |
| 5,979,360 | * | 11/1999 | Tharp | 119/51.5 |

FOREIGN PATENT DOCUMENTS

| PR 172474 B1 | 9/1998 | (DK) . |
| 0 206 636 A1 | 10/1986 | (EP) . |

* cited by examiner

*Primary Examiner*—Peter M. Poon
*Assistant Examiner*—Elizabeth Shaw
(74) *Attorney, Agent, or Firm*—William J. Sapone; Coleman Sudol Sapone, P.C.

(57) ABSTRACT

According to the invention, a trough (1) in an automatic feeder is configured so that it comprises a raised dry-feed part (2) on which the dry-feed (3) is led out and from which the pigs can eat, and with a wet-feed chamber (4) adjoining hereto where the surplus dry-feed (3) is collected, and finally with a water chamber (5) in connection herewith from which water (7) can run into the wet-feed chamber (4) and here soften the dry-feed for the formation of the wet-feed (8). In this way, the pigs are provided with easy access to both the dry-feed (3), the wet-feed (8) as well as clean drinking water in one and the same trough (1). This ensures a calm feeding situation, in that the animals have free access to said feed-stuffs and water, whereby good growth and good living conditions are achieved.

9 Claims, 3 Drawing Sheets

AUTOMATIC FEEDER

BACKGROUND OF THE INVENTION

Figure 1:
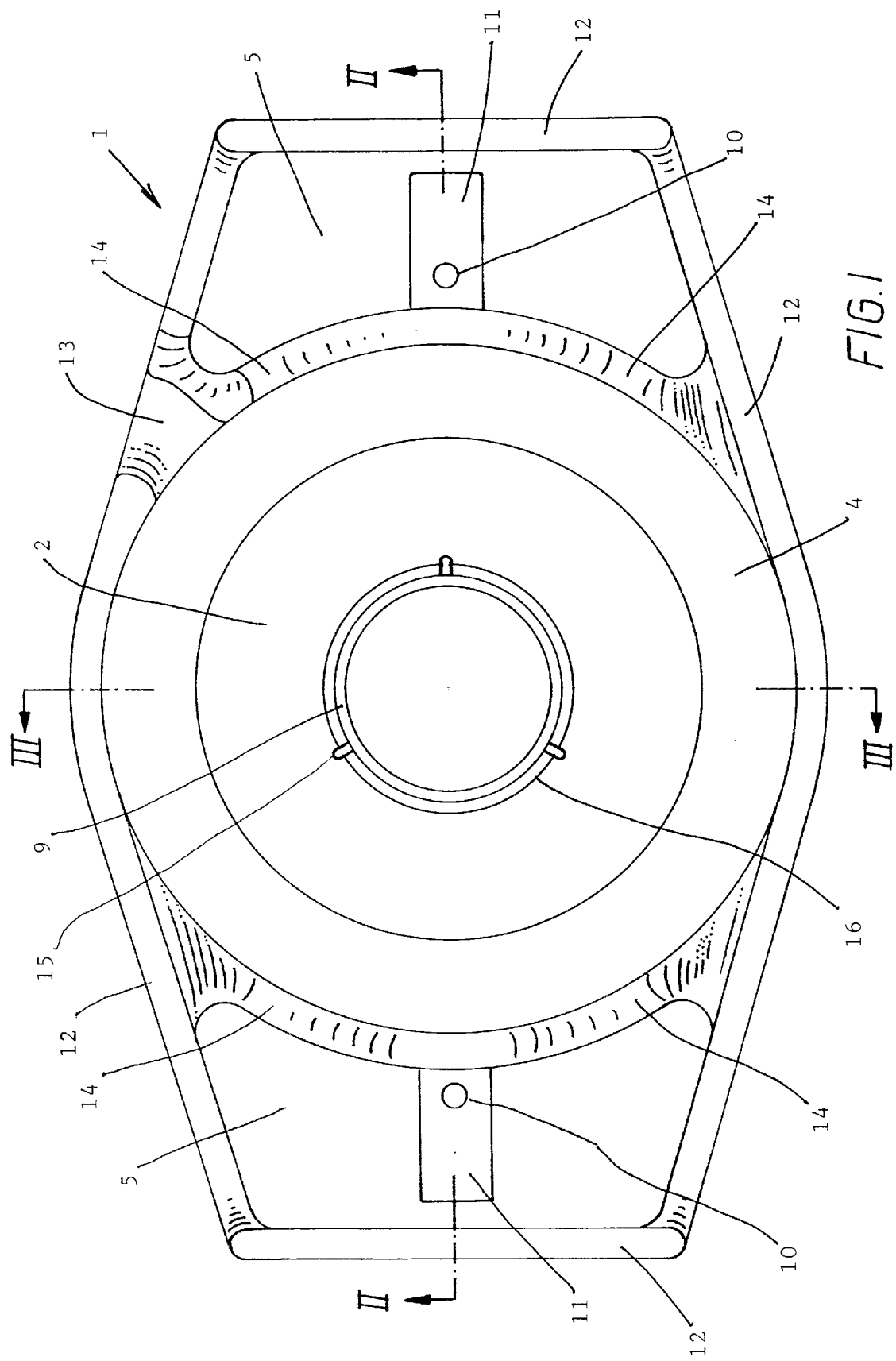

The invention concerns an automatic feeder for pigs, including piglets and porkers, comprising a dry-feed supply and a water supply which are led to a feeding trough.

Automatic feeders with both dry-feed supply and water supply are known in different configurations.

A commonly-known type of automatic feeder comprises a trough with a raised part with a so-called feeding plateau on which the dry-feed can lie when led out via a supply pipe.

Extending around this feeding plateau there is a water chamber, which means that the pigs have access both to the dry-feed and water, Under normal conditions, however, there is no possibility of the formation of wet-feed, the reason being that the dry-feed and the water fall down into separate compartments, Therefore, with this type of automatic feeder the pigs have access only to dry-feed and clean water.

A second type of automatic feeder comprises a trough to which both the feed-stuff and the water are fed via a supply pipe down to one compartment. Consequently, with this type of automatic feeder the pigs only have access to wet-feedstuff.

Moreover, where both of these types of feeders are concerned, a leaking drinking-water valve will result in a continuous supply of water, and herewith a soaking of all the dry-feed, the consequence being that the pigs have access neither to dry-feeds nor wet-feeds. Moreover, the feed-stuff gets ruined by the constant supply of water.

THE OBJECT OF THE INVENTION

It is the object of the invention to overcome the disadvantages and drawbacks of the known automatic feeders, and according to the invention this is achieved when the feeding trough comprises a raised dry-feed platform to which the feed-stuff is led, a lower-lying chamber and a water chamber lying at the same level to which the water is supplied, and where between the chamber and the water chamber there is provided a separating wall which is of such a height that the water can run over and down into the chamber, where it can soften the dry-feed to become wet-feed.

In a surprisingly simple manner, the automatic feeder achieved hereby is one where the animals have constant access to both fresh dry-feeds on the feeding platform, suitable soaked wet-feed and fresh and clean drinking water.

This ensures calm conditions around the feeding trough, in that the animals are able to satisfy their feeding and drinking needs, and this applies to both porkers and piglets. There is hereby ensured an optimum growth and well-being for the animals.

As disclosed in claim 2, by placing the feeding platform centrally surrounded by a wet chamber, and with the wet chamber outermost, continuous access is ensured to both dry and wet-feed and clean water.

There will not be any risk that this division will be disturbed by overflow or behaviour on the part of the animals.

As disclosed in claim 3, by letting the water chamber comprise two chambers, the extent of the trough and herewith the feeding and drinking possibilities are improved for ensuring calm conditions around the trough.

As disclosed in claim 4, by configuring both the feed-stuff supply and the water supply in an adjustable manner, both supplies can be adjusted in accordance with the type of feed and the feeding and drinking requirements.

As disclosed in claim 5, by configuring a raised part under the water valve, unintentional water supply is avoided, in that the animals are prevented from activating the valve with their feet.

As disclosed in claim 6, by configuring the raised dry-feed platform as a truncated cone under the supply pipe, the feed-stuff will be able to be supplied at a rate at which it is eaten from the side surface of the cone. In addition to ensuring fresh feed, this also prevents the absorption of moisture and herewith possible clump formations and interruption of the feed supply.

As disclosed in claim 7, by configuring the trough with an outer raised edge, trough wall, and providing an overflow from the wet-feed chamber, the wet-feed is protected against being ruined, in that possible surplus water will run away, which can occur in connection with a leaking water valve.

By moulding the trough in one piece as disclosed in claim 8, the trough can be brought to abut closely against the floor, hereby preventing the collection of dirt under the trough and making the cleaning work easier.

Finally, as disclosed in claim 9, it is expedient to provide the automatic feeder with a water regulator, in that the consistency of the wet-feed can hereby be controlled.

THE DRAWING

Figure 2:
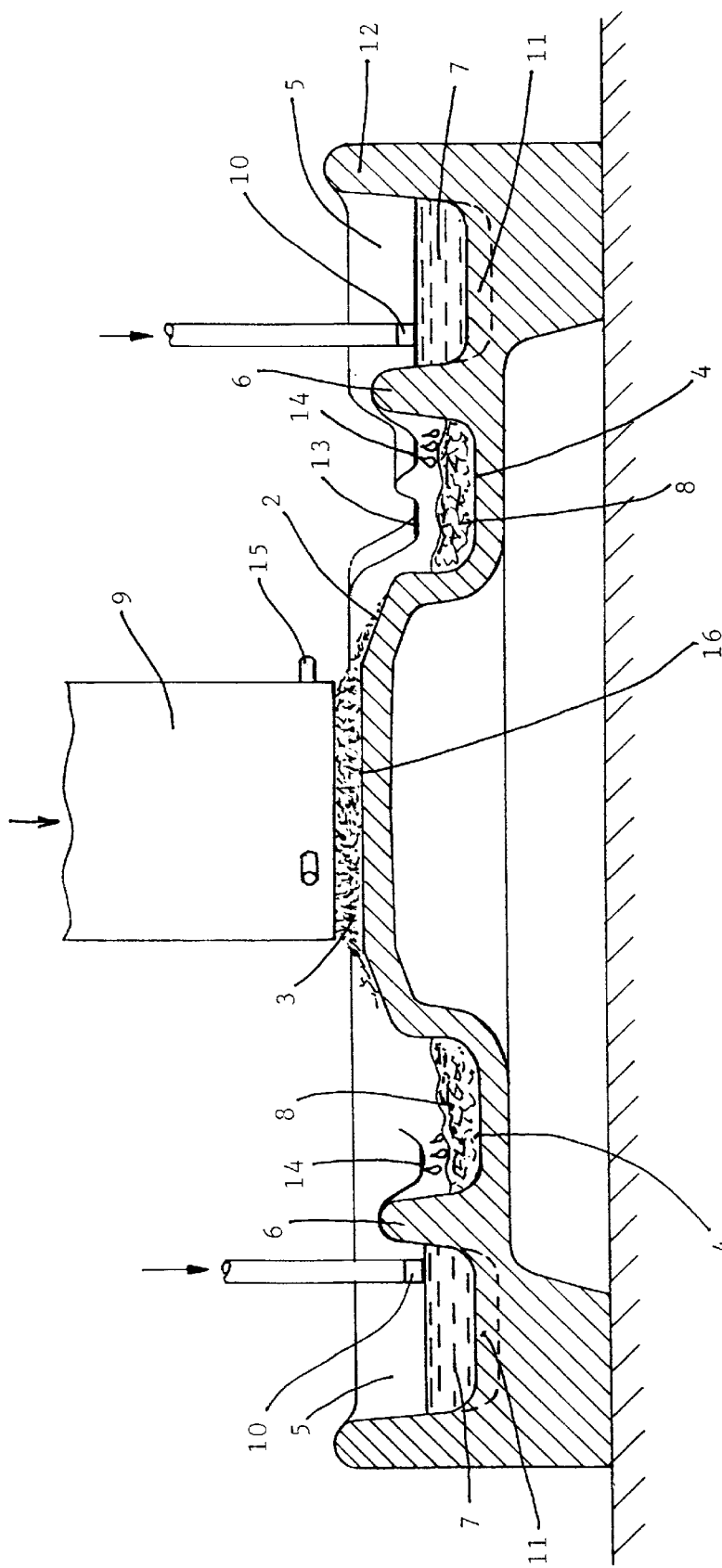
Figure 3:
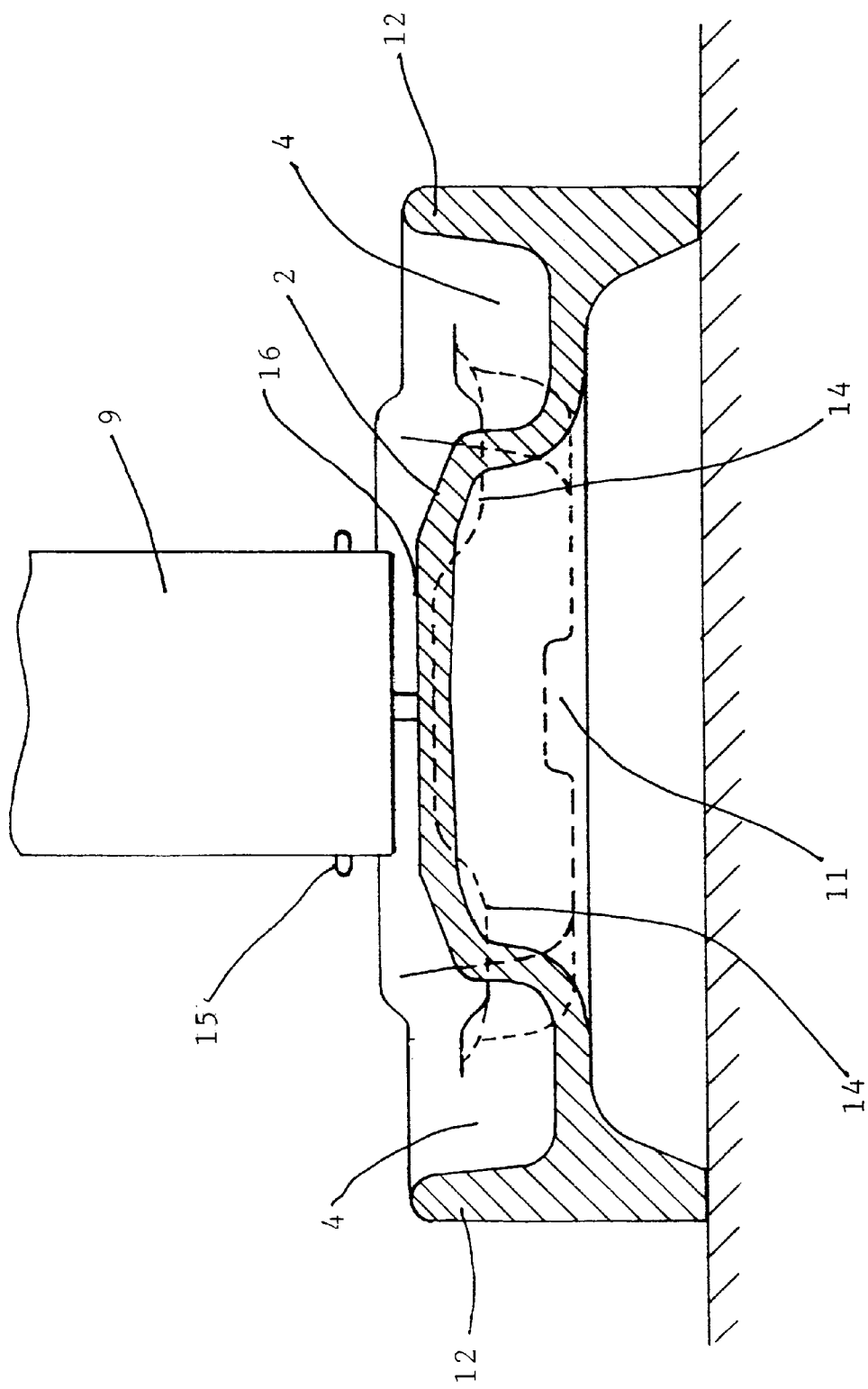

In the following, an example of a configuration according to the invention will be described in more detail with reference to the drawing, where FIG. 1 shows the feeding trough seen from above, FIG. 2 shows the trough in section seen in the direction II—II in FIG. 1, and FIG. 3 shows a section of the trough seen in the direction III—III in FIG. 1.

DESCRIPTION OF THE EXAMPLE EMBODIMENT

FIGS. 1–3 show an example of an embodiment of the automatic feeder according to the invention.

The automatic feeder comprises a feed supply pipe 9 which is provided lowermost with a number of outwardly-extending stays 15, so that in a known manner the pigs can activate the dry-feed supply through the pipe 9 and down into the feeding trough 1.

The feed-stuff supply pipe 9 opens out over a raised feed part 2 which is configured as a truncated cone, so that the surface constitutes a plateau 16 for the out-flowing feed-stuff 3, as shown in FIG. 2.

The out-flow of feed-stuff can be adjusted, in that the pipe 9 can be adjusted in height. As will appear from the drawing, the pipe 9 opens out only a short distance above the plateau 16, which ensures that the amount of feed 3 on the plateau is no more than absolutely necessary, and moreover that it will spread itself out on the side of the raised part 2, as will appear from FIG. 2.

From here, the pigs can eat the feed 3 which will always be dry and fresh.

However, some of the feed 3 will slide down into the surrounding gutter, which constitutes the wet-feed chamber 4, and here constitute the dry components of the wet-feed 8, as indicated in FIG. 2.

The supply of water takes place in a known manner via drinking-water valves 10, each of which opens out over its water chamber 5 or in the wet-feed chamber 4, as shown in FIG. 1.

The water valves can be adjusted in height, whereby the accessibility to the water valve can be controlled. The amount of water which is supplied to the automatic feeder can be controlled by means of a regulation valve mounted on the water supply.

Under each valve 10 there is configured a raised part 11 which is dimensioned in such a manner that it prevents the valve 10 from being activated by the pigs' feet. This ensures that the supply of water is not influenced by anything other than the snouts of the animals when they lack water in the water chamber 5.

As will appear from FIGS. 1 and 2, a separating wall 6 is provided between the water chamber 5 and the wet-feed chamber 4. In this wall 6 there is one or a number of depressions which form overflow edges 14 for the water 7 in the water chamber 5, so that the water can run into the wet-feed chamber 4.

Here, the water will constitute the wet component of the wet-feed, in that it is mixed with the dry-feed in the chamber 4 and ensures that the wet-feed has a suitable consistency.

In order to ensure that the wet-feed is of the correct consistency, an overflow gutter 13 is configured in the wall 12 which constitutes the outer wall of the trough which, as shown in FIG. 1, extends around the trough.

The overflow gutter 13 is at substantially the same level as the overflow gutter 14 between the water chamber 5 and the wet-feed chamber 4, the result being that the level of the water in the wet-feed chamber 4 never exceeds the level of the water in the water chamber 5. This means that the dry-feed 3 which lies in the chamber 4 does not get wasted, but can constitute a valuable wet-feed since this does not get washed away even though a water valve may leak or the water exceeds the level for the drinking water 7 in another way.

As shown in FIG. 1, the trough is elongated, which provides the pigs with good access. Both the feed-stuff supply and the water supply can be activated by large as well as small pigs, which is one of the advantages of the automatic feeder according to the invention. It is of particular importance that after the suckling period, the small pigs are able to eat sufficiently to achieve considerable growth.

The trough 1 is preferably produced by moulding in one piece in polymer concrete. This ensures a smooth surface which can be cleaned easily, and also that the trough stands in close contact with the floor of the sty. This is important from the point of view of hygiene.

Other materials such as plastic with or without fibre reinforcement can be used for producing the trough.

What is claimed is:

1. Automatic feeder for pigs, including piglets and porkers, comprising a dry-feed supply and a water supply which are led to a feeding trough, characterized in that the feeding trough (1) comprises a raised dry-feed platform (2) to which the dry-feed (3) is led, a lower-lying chamber (4) and a lying at the same level a water chamber (5) to which the water (7) is supplied, and where between the chamber (4) and the water chamber (5) there is provided a separating wall (6) which is of such a height that the water (7) can run over and down into the chamber (4) where the water can soften the dry-feed (3) to become wet-feed (8).

2. Automatic feeder according to claim 1, characterized in that the feeding trough (1) is configured with a centrally-placed raised part (2) with the wet-feed chamber (4) extending around the raised part, and with the water chamber (5) placed outside the chamber (4).

3. Automatic feeder according to claim 1, characterized in that the water chamber (5) is configured as two separate chambers.

4. Automatic feeder according to claim 1 further comprising a feed-stuff supply pipe (9) is placed over the raised feed platform (2) for the feed-stuff, and that a water valve (10) is placed over the water chamber (5), and in such a manner that both the feed-stuff supply and the water supply can be adjusted.

5. Automatic feeder according to claim 1, characterized in that in the water chamber (5) a raised part (11) is provided under the water valve (10), said raised part serving to prevent the valve from being activated by the legs of the pigs.

6. Automatic feeder according to claim 1, characterized in that the raised dry-feed platform (2) is configured as a truncated cone, the upper side (16) of which extends under the feed-stuff supply pipe (9), and with the side of the cone sloping downwards towards the wet-feed chamber (4).

7. Automatic feeder according to claim 1, characterized in that the trough (1) is surrounded by a trough wall (12), the upper edge of which extends higher than the raised dry-feed platform (2), and with a gutter (13) in to the wet-feed chamber (4), said gutter serving as an overflow for this chamber (4) when the level of the water exceeds a level which corresponds to the separating wall's (6) overflow level (14) for water (7).

8. Automatic feeder according to claim 1, characterized in that the trough (1) is moulded in one piece.

9. Automatic feeder according to claim 1, characterized in that the supply of water to water chamber (5) and wet-feed chamber (4) is controlled by a regulating valve arrangement.

* * * * *